US012680914B2

(12) United States Patent
Kimura et al.

(10) Patent No.: US 12,680,914 B2
(45) Date of Patent: Jul. 14, 2026

(54) EXHAUST GAS SAMPLING DEVICE, EXHAUST GAS ANALYSIS SYSTEM, EXHAUST GAS SAMPLING METHOD, AND PROGRAM FOR EXHAUST GAS SAMPLING DEVICE

(71) Applicant: HORIBA, LTD., Kyoto (JP)

(72) Inventors: Takeshi Kimura, Kyoto (JP);
Kazunori Kuriaki, Kyoto (JP);
Masahiro Higuchi, Kyoto (JP); **Yoji
Komatsu, Kyoto (JP); Jun Tomita**,
Kyoto (JP)

(73) Assignee: HORIBA, LTD. (JP)

( * ) Notice: Subject to any disclaimer, the term of this patent is extended or adjusted under 35 U.S.C. 154(b) by 312 days.

(21) Appl. No.: 18/701,045

(22) PCT Filed: Oct. 3, 2022

(86) PCT No.: PCT/JP2022/036938
§ 371 (c)(1),
(2) Date: Apr. 12, 2024

(87) PCT Pub. No.: WO2023/063139
PCT Pub. Date: Apr. 20, 2023

(65) Prior Publication Data
US 2024/0344931 A1     Oct. 17, 2024

(30) Foreign Application Priority Data
Oct. 15, 2021   (JP) ................................ 2021-169851

(51) Int. Cl.
G01M 15/10     (2006.01)
G01N 1/22     (2006.01)
(52) U.S. Cl.
CPC ... G01M 15/102 (2013.01); G01N 2001/2264 (2013.01)

(58) Field of Classification Search
CPC ...... G01M 15/10; G01M 15/102; G01N 1/22; G01N 1/2252; G01N 2001/2252; G01N 2001/2255; G01N 2001/2264
(Continued)

(56) References Cited

U.S. PATENT DOCUMENTS 3,603,155 A * 9/1971 Morris ............... G01N 33/0011
73/23.31
6,293,161 B1 * 9/2001 Hanashiro ............ G01N 1/2258
73/863.11
(Continued)

FOREIGN PATENT DOCUMENTS

FR     2908886 A1 * 5/2008 .......... G01M 15/102
JP     08-226879 A     9/1996
(Continued)

OTHER PUBLICATIONS

International Search Report dated Nov. 22, 2022 issued for International application No. PCT/JP2022/036938.

*Primary Examiner* — John Fitzgerald
(74) *Attorney, Agent, or Firm* — Brooks Kushman P.C.

(57) ABSTRACT

An exhaust gas sampling device that collects an exhaust gas emitted from a vehicle including an engine or a part of the vehicle into a sampling bag includes a main channel through which the exhaust gas flows, a main valve that opens and shuts the main channel, a dilution gas channel that is connected downstream from the main valve in the main channel and introduces a dilution gas into the main channel, a purge gas channel that branches from the dilution gas channel and has a downstream end connected downstream from the main valve in the main channel and upstream from a junction of the dilution gas channel and a purge pump that is disposed in the purge gas channel, sucks a part of the (Continued)

dilution gas flowing through the dilution gas channel, and delivers the sucked part as a purge gas to the main channel.

15 Claims, 7 Drawing Sheets

(58) Field of Classification Search
     USPC ........................................................ 73/23.31
     See application file for complete search history.

(56)                    References Cited

U.S. PATENT DOCUMENTS 10,233,813 B2 *    3/2019  Otsuki .................... F01N 11/00
12,553,873 B2 *    2/2026  Otsuki ................. G01N 1/2252

FOREIGN PATENT DOCUMENTS

| | | | |
|---|---|---|---|
| JP | H11344425 A | * | 12/1999 |
| JP | 2000-088719 A | | 3/2000 |
| JP | 2002071528 A | | 3/2002 |
| JP | 2011-242194 A | | 12/2011 |
| JP | 2014-174055 A | | 9/2014 |
| WO | WO-2019059008 A1 | * | 3/2019 ............. G01N 15/10 |

* cited by examiner

EXHAUST GAS SAMPLING DEVICE, EXHAUST GAS ANALYSIS SYSTEM, EXHAUST GAS SAMPLING METHOD, AND PROGRAM FOR EXHAUST GAS SAMPLING DEVICE

CROSS-REFERENCE TO RELATED APPLICATIONS

This application is the U.S. national phase of PCT Application No. PCT/JP2022/036938, filed Oct. 3, 2022, which claims priority to Japanese Patent Application No. 2021-169851, filed Oct. 15, 2021, the disclosures of which are incorporated in their entirety by reference herein.

TECHNICAL FIELD

The present invention relates to an exhaust gas sampling device, an exhaust gas analysis system, an exhaust gas sampling method, and a program for the exhaust gas sampling device.

BACKGROUND ART

An exhaust gas analysis system of this type, as disclosed in Patent Literature 1, includes a constant volume sampling device (hereinafter, also referred to as a CVS device) that controls a mixture gas obtained by mixing a dilution gas with an exhaust gas emitted from an engine at a constant flow rate and collects the mixture gas in a sampling bag. In the CVS device, a dilution gas channel through which the dilution gas flows is connected to a main channel through which the exhaust gas flows, and a part of the mixture gas is collected downstream from a junction of the exhaust gas and the dilution gas in the main channel.

CITATION LIST

Patent Literature

Patent Literature 1: JP 8-226879 A

SUMMARY OF INVENTION

Technical Problem

In an exhaust gas test that is conducted on a vehicle by using this CVS device, when the engine is temporarily stopped by, for example, idling stop during the exhaust gas test, the exhaust gas emitted immediately before the engine is stopped may remain up to the junction in the main channel without being collected in the sampling bag. In particular, as illustrated in FIG. 7, the vehicle runs in a running mode corresponding to, for example, Worldwide harmonized Light duty driving test (WLTP) on a chassis dynamo, and the concentration of the exhaust gas emitted at that time is continuously measured in a plurality of test phases (for example, a low phase, a middle phase, a high phase, an ex-high phase). In this case, if the exhaust gas remains in the main channel at a time of switching the test phase, the remaining exhaust gas cannot be collected in the test phase in which the exhaust gas should originally be collected, and may be collected after the start of the next test phase. This may affect results of the concentration measurement and the like in the respective test phases.

Such a problem that the exhaust gas remains after the engine is stopped becomes particularly remarkable in a case where the exhaust gas test is conducted on a vehicle by using an engine and an electric motor as a drive source in a hybrid vehicle (HEV or PHEV). In this test, the start and stop of the engine are repeated in one exhaust gas test.

The present invention has been made in view of the above-described problem, and a main object of the present invention is to make it possible to collect an exhaust gas without remaining the exhaust gas up to a junction of a dilution gas in a main channel after the engine is stopped in an exhaust gas analysis system using a dilution sampling method and to accurately analyze the exhaust gas from the engine.

Solution to Problem

That is, an exhaust gas sampling device of the present invention that collects an exhaust gas emitted from a vehicle including an engine or a part of the vehicle into a sampling bag includes a main channel through which the exhaust gas flows, a main valve that opens and shuts the main channel, a dilution gas channel that is connected downstream from the main valve in the main channel and introduces a dilution gas into the main channel, a purge gas channel that branches from the dilution gas channel and has a downstream end connected downstream from the main valve in the main channel and upstream from a junction of the dilution gas channel, and a purge pump that is disposed in the purge gas channel, sucks a part of the dilution gas flowing through the dilution gas channel, and delivers the sucked part as a purge gas to the main channel.

With such a configuration, by starting the purge pump disposed in the purge gas channel, a part of the dilution gas can be introduced as the purge gas between the junction of the dilution gas in the main channel and the main valve upstream from the function. Therefore, after the engine is stopped, the exhaust gas can be swept downstream without remaining up to the junction of the dilution gas in the main channel, and can be collected in the sampling bag. As a result, when the exhaust gas test is conducted in combination with the exhaust gas analysis device or the like, it is possible to reduce the loss of the exhaust gas emitted from the engine during the test, and thus, analysis accuracy can be enhanced.

In the exhaust gas sampling device described above, it is preferable to open and shuts the main valve at an appropriate timing in accordance with the start and stop of the engine. Therefore, it is preferable that the exhaust gas sampling device further includes an engine operation detection unit that detects the start and stop of the engine. In this way, for example, if the start of the engine is detected and accordingly the main valve is quickly opened, the increase in the back pressure of the engine can be reduced and the failure of the test vehicle can be prevented. In addition, for example, if stop of the engine is detected and accordingly the main valve is quickly shut, it is possible to prevent a situation where air flows from the stopped engine toward the main channel having a negative pressure and a catalyst in an exhaust pipe of the vehicle is cooled.

Further, the exhaust gas sampling device is preferably configured to output a shutting command signal to the main valve when the engine operation detection unit detects the stop of the engine, and then start the purge pump.

In this way, the main valve can be shut immediately after the engine is stopped, and the exhaust gas remaining in the main channel can be swept downstream and be sampled. In addition, since the purge pump is started after the main valve is shut, backflow of the dilution gas to the engine side can be prevented.

As described above, it is preferable that the exhaust gas sampling device can quickly detect the start and stop of the engine. Therefore, the engine operation detection unit is configured to detect the start and stop of the engine based on a pulse interval that is a time interval between pulse signals generated in accordance with the operation of the engine and a start threshold and a stop threshold used for detecting the start and the stop, respectively, of the engine, and the start threshold is preferably set to be larger than the stop threshold.

In this way, the operation of the engine can be quickly detected by setting the start threshold to a larger value. Conversely, by setting the stop threshold to a small value, the beginning of stoppage of the engine can be quickly detected.

In a case where the start threshold is set to be larger than the stop threshold as described above, for example, while the pulse interval is shortened at the start of the engine, the stop of the engine may be erroneously detected immediately after the start of the engine is correctly detected. Conversely, while the pulse interval becomes longer at the stop of the engine, the start of the engine may be erroneously detected immediately after the stop of the engine is correctly detected.

In order to prevent such erroneous detection, the engine operation detection unit is preferably configured not to detect the start or stop of the engine again until a predetermined time elapses from the detection of the start or stop of the engine.

When the engine is started from a state where the main valve is shut, if it takes time for the opening operation of the main valve, the back pressure of the engine rises, and this may lead to leakage of an exhaust gas or a failure of the vehicle. Although a main valve having a short time for the opening operation is preferably selected, a main valve having a large diameter needs to be selected in order to provide a certain flow rate in the main channel. It is thus difficult to shorten the time required for the opening operation.

Therefore, the exhaust gas sampling device preferably further includes a bypass channel that branches upstream from the main valve in the main channel and joins the main channel downstream from the main valve, and an auxiliary valve that opens and shuts the bypass channel.

In this way, by opening the auxiliary valve together with the main valve when the engine is started, the exhaust gas can be released downstream through the bypass channel until the main valve is fully opened after the start of the opening operation. This makes it possible to prevent the increase in the back pressure of the engine.

In a case where such a bypass channel is provided, it is preferable that the auxiliary valve can be opened at a higher speed than the main valve.

In this way, since the exhaust gas can be released downstream more quickly through the bypass channel, the rise of the back pressure of the engine can be prevented more reliably.

Further, it is preferable that the engine operation detection unit is configured to output an opening command signal to the main valve and the auxiliary valve when detecting the start of the engine.

In this way, since the opening operations of the main valve and the auxiliary valve can be started immediately after the start of the engine, the rise of the back pressure of the engine can be prevented more reliably.

In a case where the vehicle is a hybrid vehicle such as a hybrid electric vehicle (HEV) or a plug-in hybrid electric vehicle (PHEV) using an engine and an electric motor as power sources, the engine is repeatedly started and stopped during one exhaust gas test. An exhaust gas thus tends to remain in the main channel.

Therefore, in the exhaust gas sampling device, in a case where the vehicle uses the engine and the electric motor as power sources, the above-described effect of the present invention becomes more remarkable.

Further, the exhaust gas analysis system of the present invention includes the exhaust gas sampling device, a load device that applies a load to the vehicle or a part of the vehicle, and an exhaust gas analysis device that analyzes an exhaust gas collected in a sampling bag.

Further, an exhaust gas sampling method is a method for collecting an exhaust gas emitted from a vehicle including an engine or a part of the vehicle into a sampling bag using an exhaust gas sampling device including a main channel through which the exhaust gas flows, a main valve that opens and shuts the main channel, a dilution gas channel that is connected downstream from the main valve in the main channel and introduces a dilution gas into the main channel, a purge gas channel that branches from the dilution gas channel and has a downstream end connected downstream from the main valve in the main channel and upstream from a junction of the dilution gas channel, and a purge pump disposed in the purge gas channel, the method including starting the purge pump after stop of the engine and delivering a part of the dilution gas flowing through the dilution gas channel as a purge gas to the main channel.

Preferably, in the exhaust gas sampling method, the purge pump is automatically stopped after a predetermined time elapses from the start of the purge pump.

Further, in the sampling method, it is preferable that the collection of the exhaust gas into the sampling bag is automatically stopped when a predetermined time elapses from the stop of the engine.

In this way, it is possible to prevent the concentration of the exhaust gas in the sampling bag from being reduced by continuously collecting a gas into the sampling bag after the engine is stopped.

Further, in order to prevent a sampling leakage of the exhaust gas after the engine is restarted, it is preferable that with the sampling method, the collection of the exhaust gas into the sampling bag is automatically restarted when the engine is restarted.

Further, a program for an exhaust gas sampling device of the present invention is a program for collecting an exhaust gas emitted from a vehicle including an engine or a part of the vehicle into a sampling bag, the exhaust gas sampling device including a main channel through which the exhaust gas flows, a main valve that opens and shuts the main channel, a dilution gas channel that is connected downstream from the main valve in the main channel and introduces a dilution gas into the main channel, a purge gas channel that branches from the dilution gas channel and has a downstream end connected downstream from the main valve in the main channel and upstream from a junction of the dilution gas channel, and a purge pump disposed in the purge gas channel, the program causing a computer to function as a purge operation control unit that starts the purge pump after stop of the engine and delivers a part of the dilution gas flowing through the dilution gas channel as a purge gas to the main channel.

According to the exhaust gas analysis system, the exhaust gas sampling device, and the program for the exhaust gas sampling device, the same operation and effect as those of the exhaust gas sampling device of the present invention can be obtained.

Advantageous Effects of Invention

According to the present invention configured as described above, in the exhaust gas analysis system using the dilution sampling method, an exhaust gas from the engine can be accurately analyzed by collecting the exhaust gas without allowing the exhaust gas to remain up to the junction of the dilution gas in the main channel after the engine is stopped.

DESCRIPTION OF EMBODIMENTS

Hereinafter, an embodiment of an exhaust gas analysis system 100 including an exhaust gas sampling device 2 of the present invention will be described with reference to the drawings.

The exhaust gas analysis system 100 of the present embodiment is for conducting an exhaust gas test of analyzing an exhaust gas emitted from an engine E of a hybrid vehicle, which is a test vehicle M, having an electric motor (motor) as a drive source. The hybrid vehicle is, for example, a hybrid electric vehicle (HEV) or a plug-in hybrid electric vehicle (PHEV). The exhaust gas analysis system 100 employs a dilution sampling method for diluting the exhaust gas with a dilution gas and measuring a concentration. Note that the test target is not limited to a completed vehicle, and may be a drive system including the engine E and the electric motor (motor).

Figure 1:
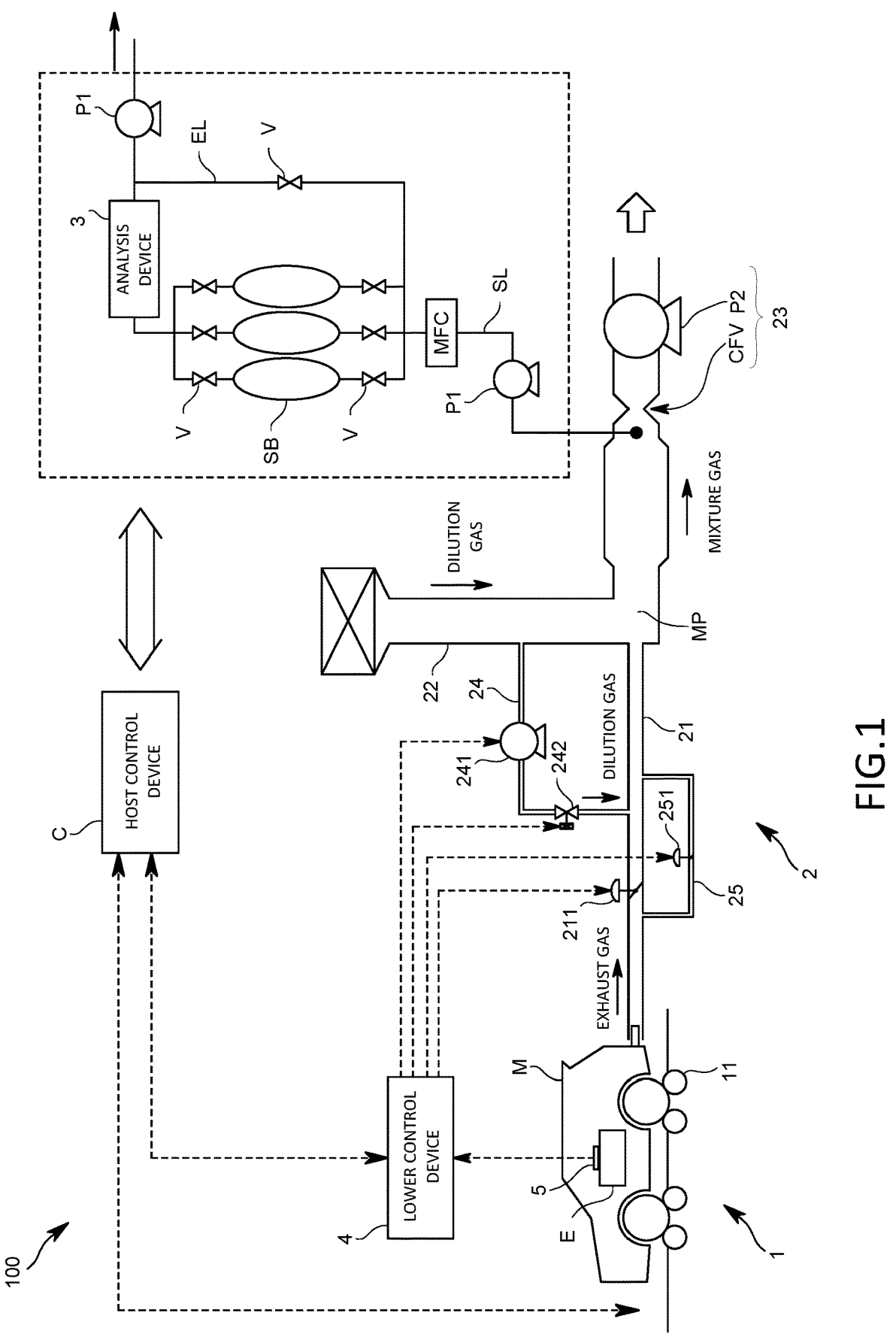
FIG. 1 is a schematic diagram schematically illustrating a configuration of an exhaust gas analysis system according to the present embodiment.

Specifically, as illustrated in FIG. 1, the exhaust gas analysis system 100 includes a chassis dynamometer (load device in the claims) 1 including a chassis roller 11 on which the test vehicle M is placed, and the exhaust gas sampling device 2. The exhaust gas analysis system 100 causes the test vehicle M to run in a predetermined running mode on the chassis dynamometer 1, collects a mixture gas (diluted exhaust gas) obtained by diluting the exhaust gas emitted during the running with the dilution gas in a sampling bag SB, and causes an analysis device 3, such as a non-dispersive infrared gas analyzer (NDIR) or a flame ionization detector (FID), to measure the concentrations of various components contained in the mixture gas. Note that although FIG. 1 illustrates one analysis device 3, the exhaust gas analysis system 100 may include a plurality of analysis devices 3. In addition, the predetermined running mode means a running mode for an on-road running test defined as the laws and regulations of forums of the United Nations such as Worldwide harmonized Light vehicles Test Procedure (WLTP), JC08, LA #4, and New European Driving Cycle (NEDC) and of each country, and a plurality of phases is set in one test cycle.

The exhaust gas sampling device 2 is a constant volume sampling device 2 referred to as a so-called constant volume sampler (CVS). This device includes a main channel 21 through which an exhaust gas emitted from the engine E flows, a dilution gas channel 22 that merges with the main channel 21 and through which dilution air (dilution gas) purified by, for example, a dilution air purification device flows, a constant flow rate mechanism 23 that is disposed downstream from a junction MP of the main channel 21 and the dilution gas channel 22 and makes a flow rate of a mixture gas (diluted dilution exhaust gas) of the exhaust gas and the dilution gas constant, and a host control device C.

A sampling channel SL for collecting the mixture gas into the sampling bag SB is connected downstream from the junction MP in the main channel 21. A mass flow controller MFC as a flow rate control device and a suction pump (also referred to as a sampling pump) P1 such as a blower are disposed in the sampling channel SL. Note that as the flow rate control device, a critical flow rate venturi or the like may be used.

The constant flow rate mechanism 23 sets a main flow rate (hereinafter, referred to as a CVS flow rate), which is a total flow rate of the exhaust gas introduced into the main channel 21 and the dilution gas introduced into the dilution gas channel 22, to a constant flow rate. Specifically, this mechanism includes a critical flow rate venturi CFV disposed downstream from the main channel 21 and a suction pump P2 disposed downstream from the critical flow rate venturi CFV. With such a configuration, the total flow rate of the exhaust gas and the dilution gas becomes a constant CVS flow rate by setting differential pressure upstream and downstream from the critical flow rate venturi CFV to a required value or more using the suction pump P2. Note that the mixture gas sucked by the suction pump P2 is released to the outside.

With the exhaust gas sampling device 2 configured as described above, a part of the mixture gas is accommodated in the sampling bag SB via the sampling channel SL in a state where the CVS flow rate is constant. The mixture gas contained in the sampling bag SB is then supplied to the analysis device 3, and the analysis device 3 calculates the concentration of a component to be measured in the exhaust gas. The analysis device 3 includes a concentration calculation unit (not illustrated) that calculates a concentration, a display (not illustrated) that displays a calculation result, and the like.

The host control device C is a computer including a central processing unit (CPU), a memory, a communication interface, an input unit, and the like. The host control device C controls each device (a pump P1, a valve V, the analysis device 3) on the sampling channel SL by causing the CPU to execute the program stored in the memory, thereby controlling execution or stop of the sampling operation.

Thus, in order not to prevent the exhaust gas from remaining in the main valve 211 after the engine of the vehicle is stopped, the exhaust gas sampling device 2 of the present embodiment includes a main valve 211 disposed upstream from the junction MP of the dilution gas in the main channel 21, a purge gas channel 24 for introducing the purge gas between the main valve 211 and the junction MP in the main channel 21, and a lower control device 4.

The main valve 211 is for opening and shutting the main channel 21, and is opened and shut in accordance with an opening-shutting signal output from the lower control device 4.

The purge gas channel 24 branches from the dilution gas channel 22, and its downstream end is connected between the main valve 211 and the junction MP in the main channel 21. The purge gas channel 24 is provided with a purge pump 241, such as a compressor or a blower, that sucks a part of the dilution gas flowing through the dilution gas channel 22 and delivers the sucked dilution gas as the purge gas to the main channel 21, and a purge valve 242 that opens and shuts the purge gas channel 24. The purge pump 241 is started or stopped in accordance with a signal output from the lower control device 4. Further, the purge valve 242 is opened and shut in accordance with the opening-shutting signal output from the lower control device 4.

Further, the exhaust gas sampling device 2 of the present embodiment includes a bypass channel 25 that branches upstream from the main valve 211 in the main channel 21 so as to prevent the back pressure of the engine E from rising when the engine E is started from a state where the main valve 211 is shut.

The bypass channel 25 is disposed in parallel with the main valve 211 and communicates with the junction MP of the main channel 21. That is, the downstream end of the bypass channel 25 is connected to the main channel 21 downstream from the main valve 211 and upstream from the junction MP. The bypass channel 25 of the present embodiment is configured so that the channel diameter or the channel cross-sectional area is smaller than the channel diameter or the channel cross-sectional area upstream from the junction MP in the main channel 21.

The bypass channel 25 is provided with an auxiliary valve 251 that opens and shuts this channel. The auxiliary valve 251 is a butterfly valve or the like that is opened and shut in accordance with the opening-shutting signal output from the lower control device 4. The auxiliary valve 251 has a smaller diameter than that of the main valve 211, has a shorter opening time (specifically, the time from input of the opening signal to the fully opened state) than that of the main valve 211, and can be opened at a high speed.

Figure 2:
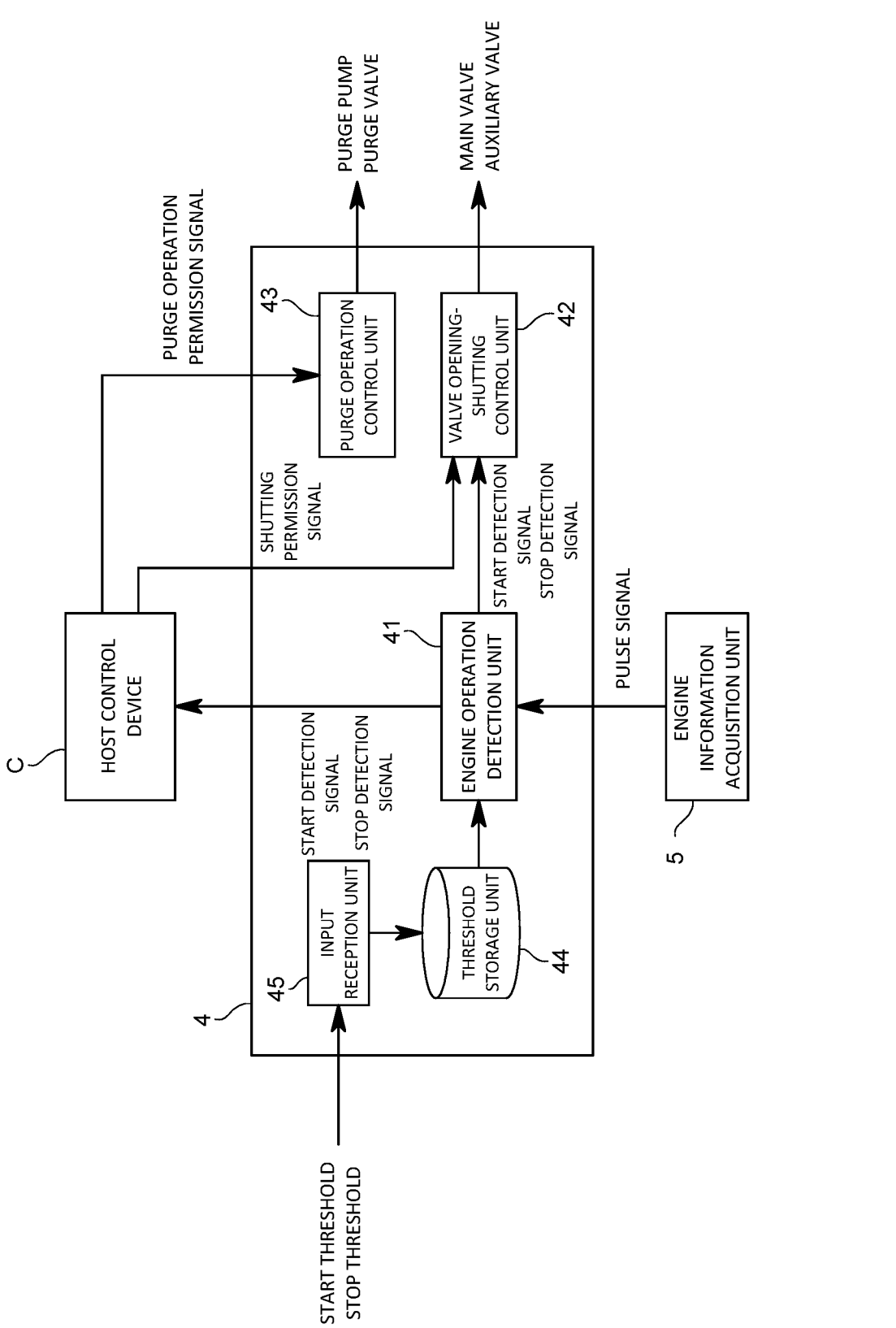
FIG. 2 is a functional block diagram illustrating functions of a control device according to the embodiment.

The lower control device 4 is a computer including a CPU, a memory, a communication interface, an input unit, and the like. This device is configured to exert functions as an engine operation detection unit 41, a purge operation control unit 43, a valve opening-shutting control unit 42, a threshold storage unit 44, and an input reception unit 45 as illustrated in FIG. 2 by causing the CPU to execute a program stored in the memory.

Figure 3:
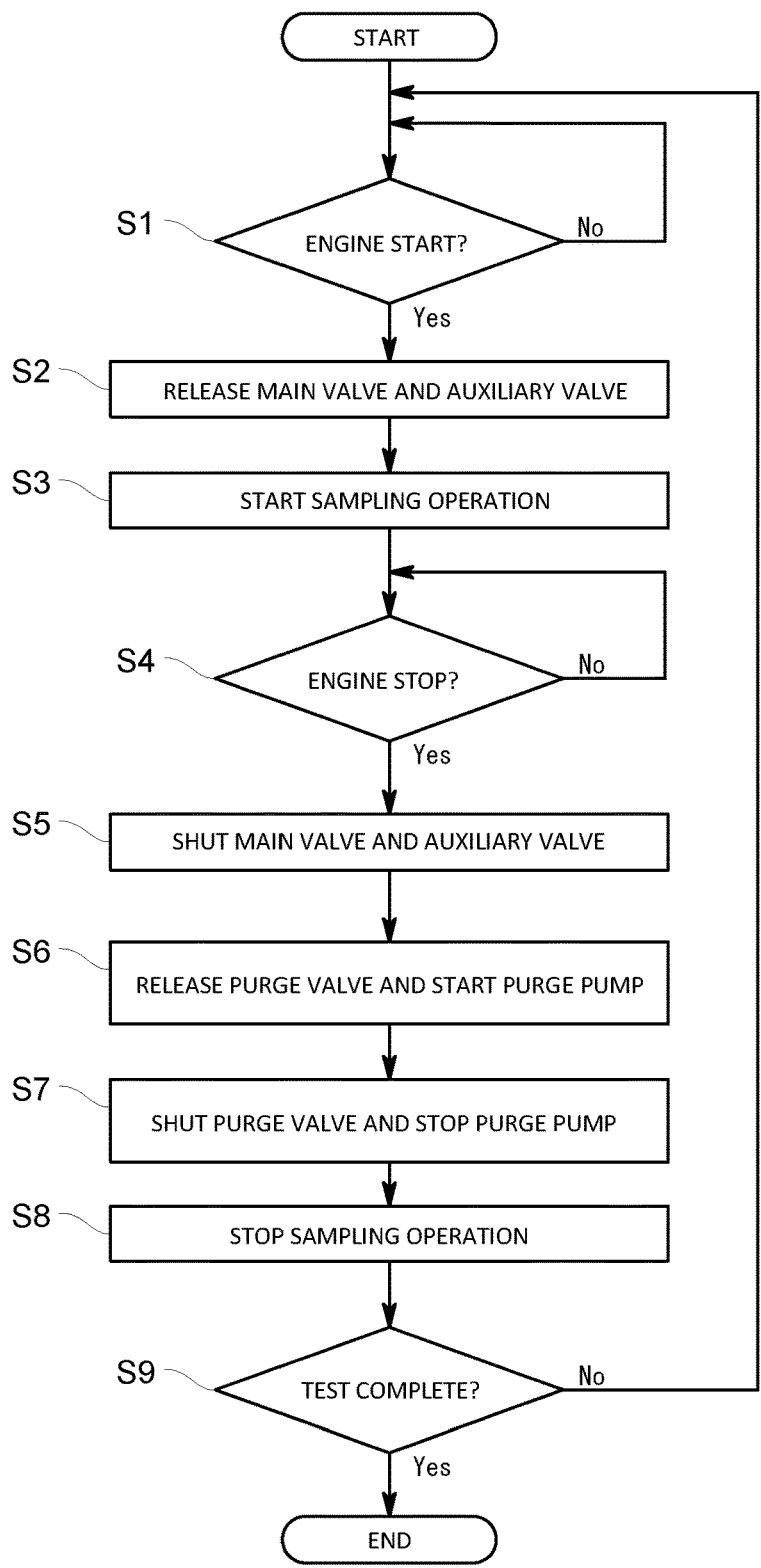
FIG. 3 is a flowchart illustrating control contents of the control device according to the present embodiment.

Hereinafter, the operation of the exhaust gas sampling device 2 in the exhaust gas test and also each unit will be described with reference to the flowchart of FIG. 3.

First, at the start of the exhaust gas test, the main valve 211, the auxiliary valve 251, and the purge valve 242 are all shut, and the purge pump 241 and the sampling pump P1 are stopped. When the exhaust gas test is started, the engine operation detection unit 41 receives engine information used for detecting the start and stop of the engine E. Note that in a case where the engine E is started, the test vehicle M moves using only the engine E as a power source or using both the engine E and an electric motor (motor) as a power source. In a case where the engine E is stopped, the test vehicle M moves using the electric motor (motor) as the power source.

In the present embodiment, the exhaust gas analysis system 100 further includes an engine information acquisition unit 5 that acquires the engine information described above. The engine information acquisition unit 5 detects an engine rotation pulse generated in accordance with the operation of the engine E, and outputs a pulse signal indicating the engine rotation pulse as engine information. Specifically, the engine information acquisition unit 5 is a contact or non-contact ignition pulse sensor, a vibration sensor, a pulsation sensor, or the like.

Figure 4:
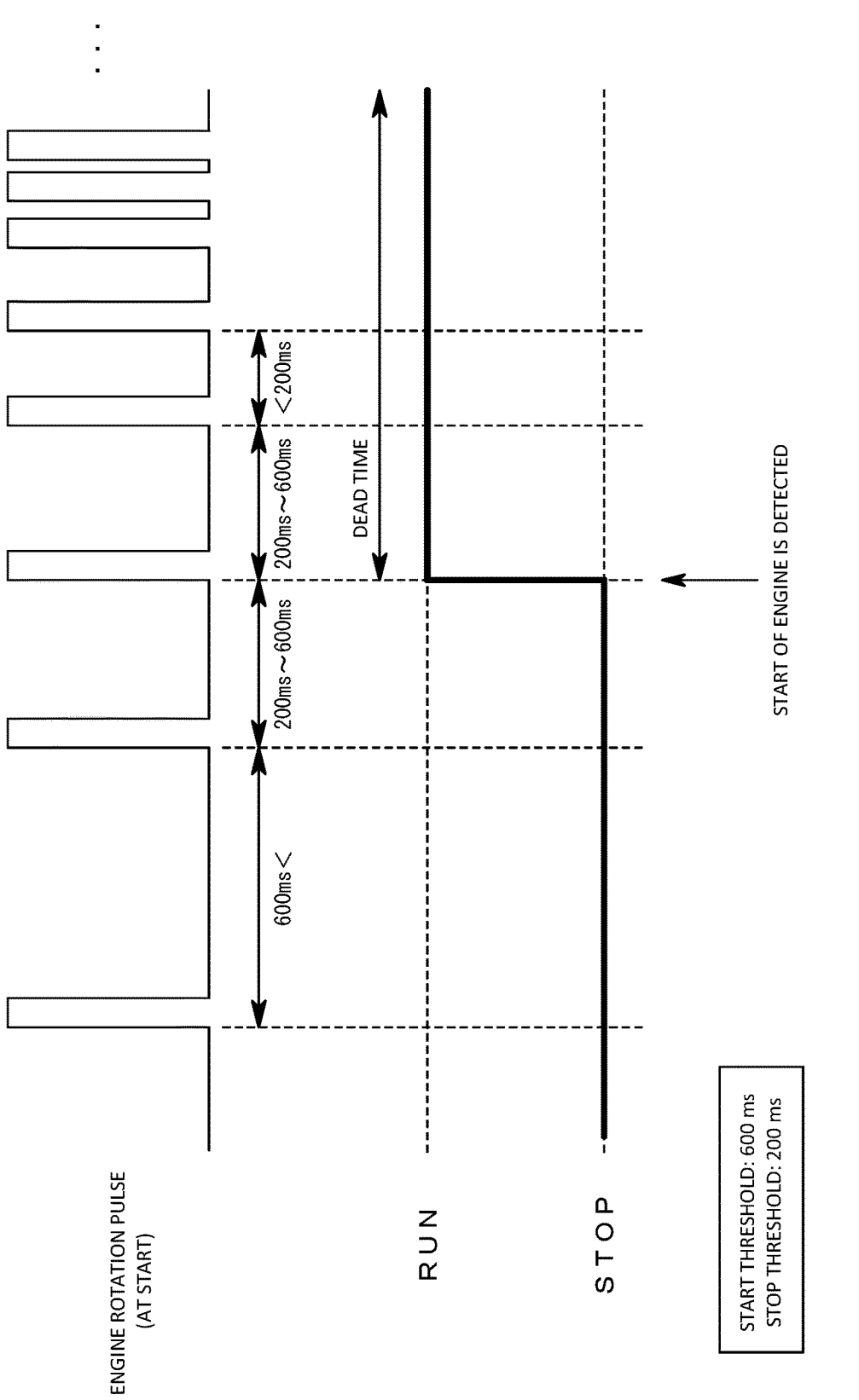
FIG. 4 is a diagram explaining an engine rotation pulse at start of an engine and a timing when an engine operation detection unit detects the start of the engine in the present embodiment.

Next, the engine operation detection unit 41 detects the start of the engine E based on the pulse signal which is the acquired engine information (S1). Specifically, the engine operation detection unit 41 is configured to determine whether the engine E is started by comparing a pulse interval which is a time interval between the pulse signals with a preset start threshold. More specifically, as illustrated in FIG. 4, the engine operation detection unit 41 determines that the engine E has been started in a case where the acquired pulse interval is below the start threshold in a state (STOP) where the engine E is determined to be stopped. Note that the start threshold may be appropriately changed, but is set to 600 ms here.

When detecting the start of the engine E, the engine operation detection unit 41 transmits a start detection signal indicating that the start of the engine E has been detected to the host control device C and the valve opening-shutting control unit 42. When receiving the start detection signal, the valve opening-shutting control unit 42 immediately outputs an opening command signal to the main valve 211 and the auxiliary valve 251 to start the opening operation of the main valve 211 and the auxiliary valve 251 (S2). Upon receiving the start detection signal, the host control device C controls each device on the sampling channel SL immediately or after a predetermined time elapses, and starts sampling of the mixture gas (S3).

Figure 5:
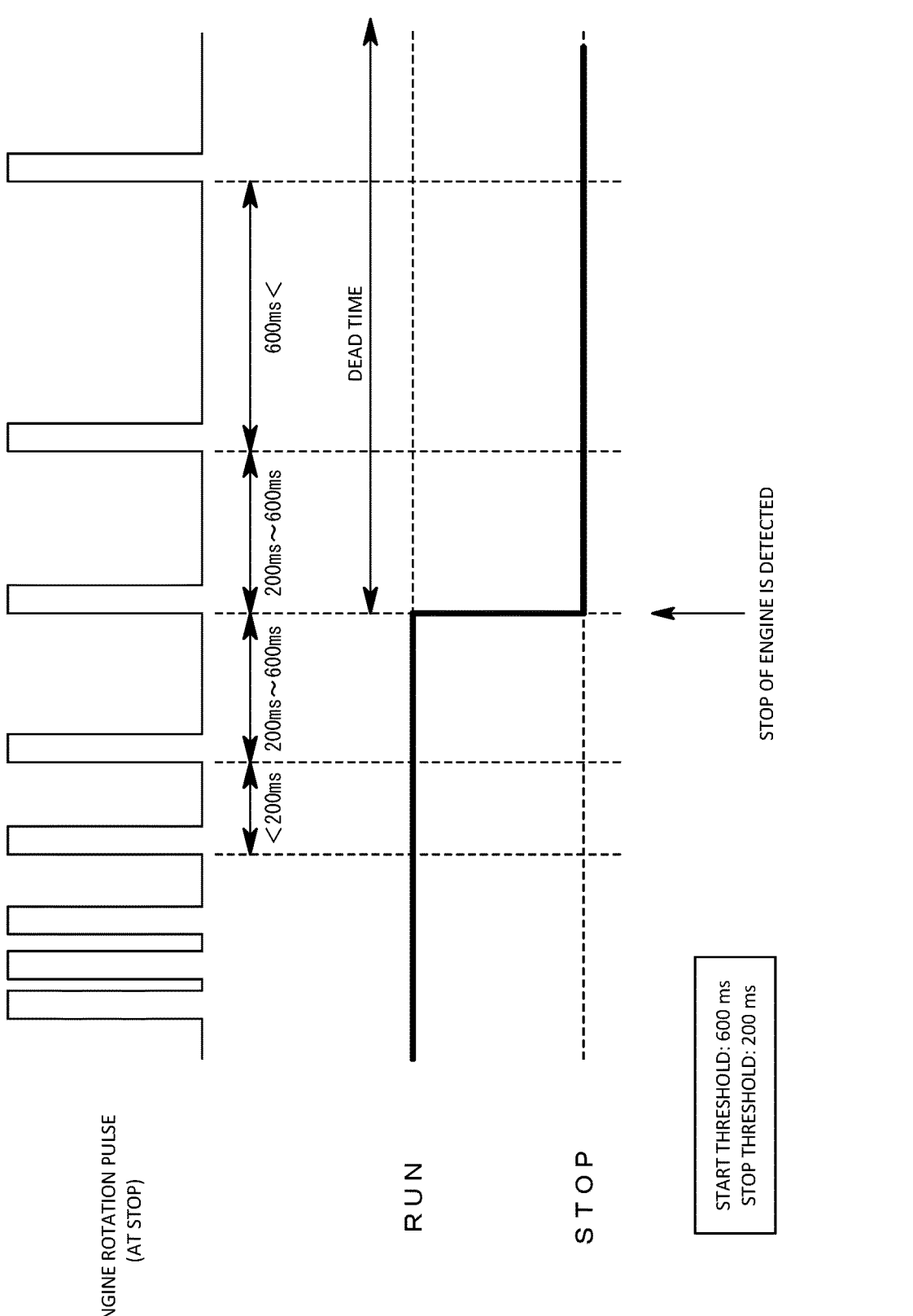
FIG. 5 is a diagram explaining an engine rotation pulse at stop of the engine and a timing when the engine operation detection unit detects the stop of the engine in the present embodiment.

Next, the engine operation detection unit 41 detects the sop of the engine E based on a pulse signal which is the acquired engine information (S4). Specifically, the engine operation detection unit 41 is configured to determine whether the engine E has stopped by comparing a pulse interval with a preset stop threshold. More specifically, as illustrated in FIG. 5, the engine operation detection unit 41 determines that the engine E has been stopped in a case where the acquired pulse interval is over the start threshold in a state (RUN) where the engine E is determined to be operated. Note that the stop threshold may be appropriately changed, but is set to 200 ms here.

Here, as illustrated in FIG. 4, the engine operation detection unit 41 is configured not to detect the stop of the engine E until a predetermined time (dead time) elapses from the detection of the start of the engine E so as not to erroneously detect that the engine E has been stopped after the start of the engine E is detected in S1. That is, after the start of the engine E is detected, the pulse signal output from the engine information acquisition unit 5 is ignored until a predetermined time elapses. Similarly, as illustrated in FIG. 5, the engine operation detection unit 41 is configured not to detect the start of the engine E until a predetermined time (dead time) elapses from the detection of the stop of the engine E so as not to erroneously detect that the engine E has been started after the stop of the engine E is detected in S4. These dead times are set to sufficiently larger values (3 times or more the start threshold, such as 2000 ms) than larger one of the start threshold and the stop threshold.

Note that the start threshold and the stop threshold referred to by the engine operation detection unit 41 are stored in the threshold storage unit 44 set in a predetermined area of the memory. The start threshold and the stop threshold can be optionally changed by a user. Specifically, when the user inputs a start threshold or a stop threshold with a keyboard or the like, not illustrated, this input is received by the input reception unit 45. The input reception unit 45 then stores and updates the received start threshold or stop threshold in the threshold storage unit 44.

When detecting the stop of the engine E, the engine operation detection unit 41 transmits a stop detection signal indicating that the stop of the engine E has been detected to the host control device C and the valve opening-shutting control unit 42. Here, the host control device C transmits a shutting permission signal to the valve opening-shutting control unit 42 after a lapse of a predetermined time from the reception of the stop detection signal. When receiving the shutting permission signal, the valve opening-shutting control unit 42 outputs a shutting command signal to the main valve 211 and the auxiliary valve 251 simultaneously to start the shutting operation of the main valve 211 and the auxiliary valve 251 (S5).

In addition, the host control device C transmits a purge operation permission signal indicating that the purge operation may be started to the purge operation control unit 43 simultaneously with the transmission of the shutting permission signal to the valve opening-shutting control unit 42 or after the lapse of a predetermined time. When receiving the purge operation permission signal, the purge operation control unit 43 outputs an opening command signal to the purge valve 242 and outputs a start command signal to the purge pump 241 (S6).

As a result, the purge operation is started, and a part of the dilution gas flowing through the dilution gas channel 22 flows through the purge gas channel 24 and is introduced into the main channel 21 as the purge gas. Then, the exhaust gas remaining between the main valve 211 and the junction MP in the main channel 21 is swept downstream by the purge gas and is sampled.

After a lapse of a predetermined time from the output of the start command signal to the purge pump 241, the purge operation control unit 43 outputs a stop command signal to the purge pump 241 to stop the operation, and outputs a shutting command signal to the purge valve 242 to shut the purge valve (S7).

Then, after a lapse of a predetermined time from when the purge operation control unit 43 outputs the stop command signal to the purge pump 241, the host control device C controls each device on the sampling channel SL to stop the sampling of the mixture gas (S8). Thereafter, steps S1 to S8 are repeated until the running test is ended (S9).

With the exhaust gas analysis device 3 according to the present embodiment configuration in such a manner, by starting the purge pump 241 disposed in the purge gas channel 24, a part of the dilution gas can be introduced as the purge gas between the junction MP of the dilution gas in the main channel 21 and the main valve 211 disposed upstream from the junction. Therefore, after the engine E is stopped, the exhaust gas can be swept downstream without remaining up to the junction MP of the dilution gas in the main channel 21, and can be collected in the sampling bag SB. As a result, when the exhaust gas test is conducted in combination with the exhaust gas analysis device 3 or the like, the loss of the exhaust gas emitted from the engine E can be reduced during the test, and thus, analysis accuracy can be enhanced.

Further, the engine operation detection unit 41 can quickly detect the beginning of the movement of the engine E by setting the start threshold to a large value. Conversely, by setting the stop threshold to a small value, the beginning of stoppage of the engine E can be quickly detected. Here, since the engine operation detection unit 41 is configured not to detect the start or stop of the engine E until a predetermined dead time elapses from the detection of the start or stop of the engine E, the detection unit can prevent erroneous detection while quickly detecting the start and stop of the movement of the engine E.

In addition, since the bypass channel 25 disposed in parallel with the main valve 211 and the auxiliary valve 251 that opens and shuts the bypass channel 25 are disposed, by opening the auxiliary valve 251 together with the main valve 211 when the engine E is started, the exhaust gas can be released downstream through the bypass channel 25 until the main valve 211 is fully opened after the start of the opening operation, and a rise of back pressure of the engine E can be prevented.

Other Embodiments

Note that the present invention is not limited to the above embodiment.

Figure 6:
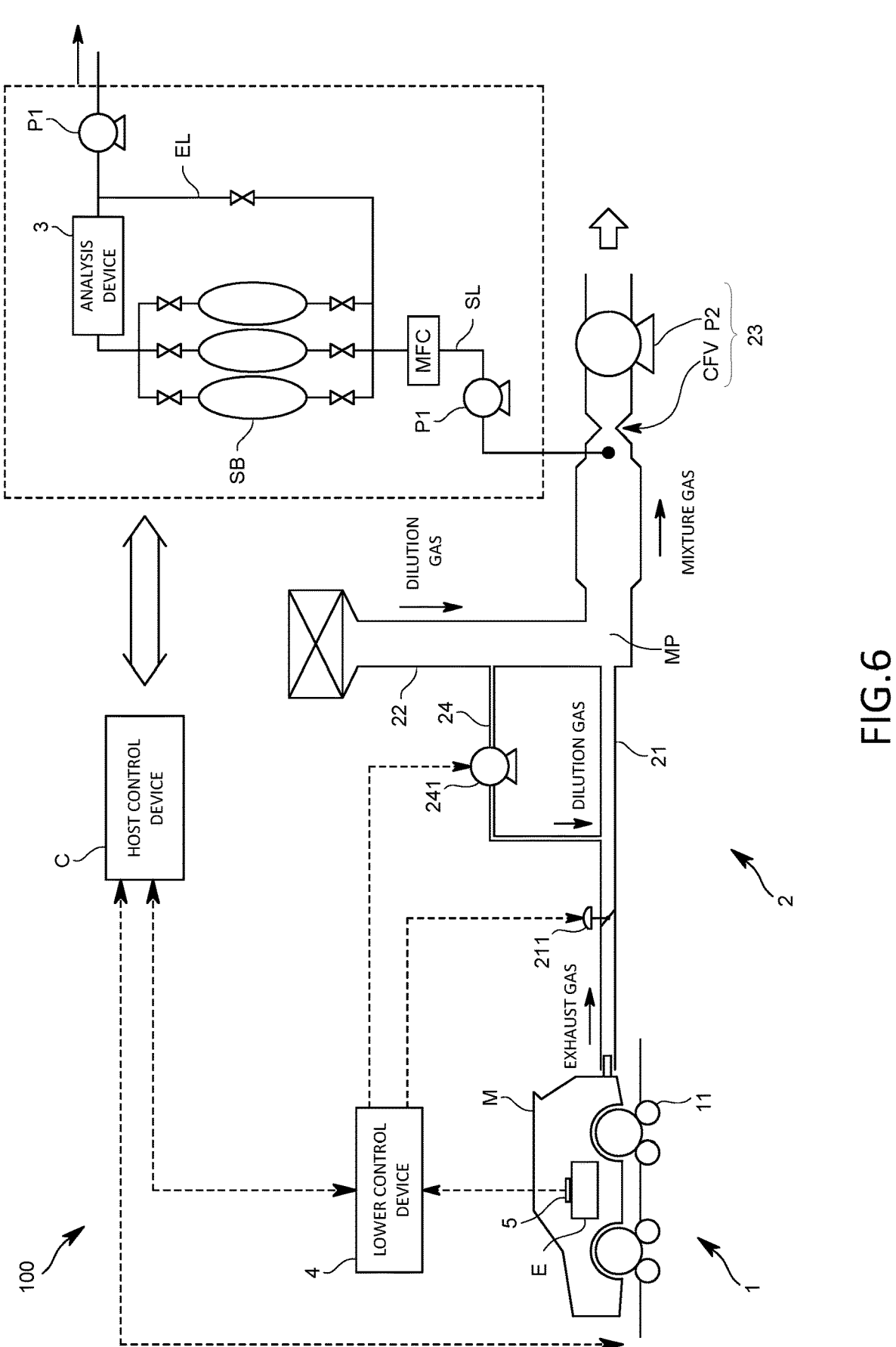
FIG. 6 is a schematic diagram illustrating a configuration of an exhaust gas analysis system according to another embodiment.
Figure 7:
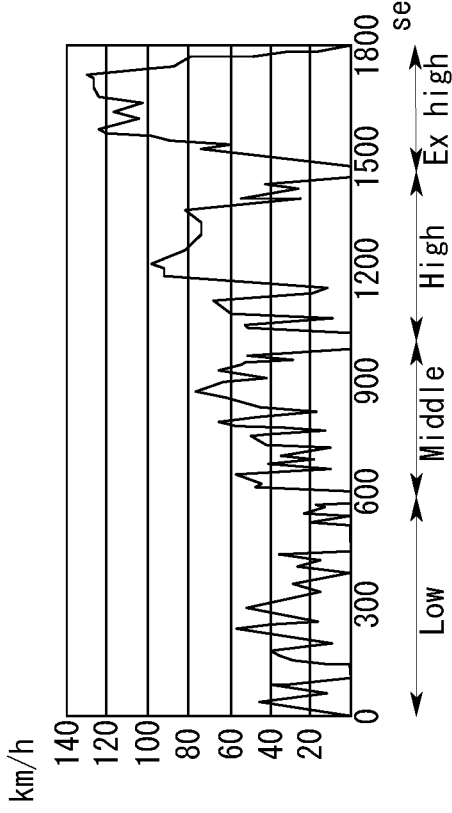
FIG. 7 is a graph illustrating an example of a running mode defined by a Worldwide harmonized Light vehicle Test Procedure (WLTP).

For example, the exhaust gas sampling device 2 of the embodiment includes the bypass channel 25 and the auxiliary valve 251 disposed in parallel with the main valve 211, but is not limited thereto. As illustrated in FIG. 6, the exhaust gas analysis device 3 of another embodiment may not include the bypass channel 25 and the auxiliary valve 251. Further, as illustrated in FIG. 6, the purge valve 242 may not be disposed in the purge gas channel 24. Further, the channel diameter or the channel cross-sectional area of the bypass channel 25 may identical to the channel diameter or the channel cross-sectional area of the main channel.

In the above embodiment, the valve opening-shutting control unit 42 is configured to output the shutting command signal to the main valve 211 and the auxiliary valve 251 when receiving the shutting permission signal from the host control device C, but the present invention is not limited thereto. In another embodiment, the valve opening-shutting control unit 42 may output a shutting command signal to the main valve 211 and the auxiliary valve 251 immediately when receiving the stop detection signal from the engine operation detection unit 41. The valve opening-shutting control unit 42 is not limited to the one that simultaneously outputs the shutting command signal to the main valve 211 and the auxiliary valve 251, and may be configured to output the shutting command signal to the respective valves at different timings. Similarly, the valve opening-shutting control unit 42 may output an opening command signal to the main valve 211 and the auxiliary valve 251 at different timings.

Further, when receiving the purge operation permission signal from the host control device C, the purge operation control unit 43 of the above embodiment outputs the start command signal to the purge pump 241, but the present invention is not limited thereto. The purge operation control unit 43 of another embodiment may be configured to acquire signals from a valve opening degree sensor that detects the opening degrees of the main valve 211 and the auxiliary valve 251, and output a start command signal to the purge pump 241 after the main valve 211 and the auxiliary valve 251 are fully shut.

Further, in another embodiment, the purge valve 242 may not be disposed in the purge gas channel 24.

In the above embodiment, all the functions of the engine operation detection unit 41, the purge operation control unit 43, the valve opening-shutting control unit 42, the threshold storage unit 44, and the input reception unit 45 are exerted by the single lower control device 4, but the present invention is not limited thereto. In another embodiment, some of these functions may be exerted by another control device.

In the above embodiment, in the engine operation detection unit 41, the start threshold is set to a larger value than the stop threshold, but the present invention is not limited thereto. In another embodiment, the start threshold may be identical to or not more than the stop threshold. Further, the dead time may not be set.

In the embodiment described above, the engine operation detection unit 41 acquires a pulse signal from the engine information acquisition unit 5 that detects the engine rotation pulse, thereby detecting the start and stop of the engine E. However, the invention is not limited thereto. The engine operation detection unit 41 of another embodiment may receive various kinds of information such as an ON/OFF signal of the engine E from an engine control unit (ECU) mounted on the test vehicle M. In this case, the ECU is the engine information acquisition unit 5. Furthermore, the exhaust gas analysis system 100 may include a plurality of types of engine information acquisition units 5.

In addition, the exhaust gas sampling device 2 of the present invention may be applied to the exhaust gas analysis system 100 using a back mini diluter that collects a part of the exhaust gas and dilutes the collected part of the exhaust gas at a constant ratio.

Further, the test vehicle M is not limited to a hybrid vehicle, and may be an automobile having the engine E and a power source different from the engine E, or a vehicle having only the engine E as a power source.

Further, the exhaust gas analysis system 100 conducts the test on the vehicle M using the chassis dynamometer 1 as a load device that applies a load to the vehicle M. However, the present invention is not limited to this. The exhaust gas analysis system 100 of another embodiment may be configured to conduct the test on an engine of a vehicle using, for example, an engine dynamometer as a load device instead of the chassis dynamometer 1.

In the exhaust gas analysis system 100, the main valve 211 and the auxiliary valve 251 are shut at the start of the exhaust gas test, but the present invention is not limited thereto. In another embodiment, the main valve 211 and the auxiliary valve 251 may be opened at the start of the exhaust gas test. In this case, the opening operation (step S2) of the main valve 211 and the auxiliary valve 251 after the engine start (S1) in FIG. 3 is unnecessary. After completion of the test (step S9), the main valve 211 and the auxiliary valve 251 may be opened, for example.

In addition, the host control device C of another embodiment may be configured to control each device on the sampling channel SL to stop the sampling of the mixture gas after a lapse of a predetermined time from the acquisition of the stop detection signal. That is, the sampling may be stopped only when the stop time of the engine E is long.

The sampling operation may be stopped by shutting the valve V leading to the sampling bag SB and opening the valve V of the exhaust line EL provided so as to bypass the sampling bag SB and the analysis device 3.

Further, the exhaust gas analysis system 100 is configured to detect (S4) the stop of the engine E and then detect (S1) the start of the engine after performing the steps S5 to S8 in the exhaust gas test, but the present invention is not limited to this. The exhaust gas analysis system 100 of another embodiment may be configured to execute step S2 and subsequent steps immediately when detecting the start of the engine between steps S5 to S8.

In addition, the present invention is not limited to the above embodiments, and it goes without saying that various modifications can be made without departing from the gist of the present invention.

INDUSTRIAL APPLICABILITY

According to the present invention described above, in the exhaust gas analysis system using the dilution sampling method, an exhaust gas from the engine can be accurately analyzed by collecting the exhaust gas without allowing the exhaust gas to remain up to the junction of the dilution gas in the main channel after the engine is stopped.

REFERENCE SIGNS LIST

100 exhaust gas analysis system
2 exhaust gas sampling device
21 main channel
211 main valve
22 dilution gas channel
24 purge gas channel
241 purge pump
3 analysis device
4 lower control device
V vehicle
E engine
SB sampling bag
MP junction

The invention claimed is:

1. An exhaust gas sampling device that collects an exhaust gas emitted from a vehicle including an engine or a part of the vehicle into a sampling bag, the device comprising:
   a main channel through which the exhaust gas flows;
   a main valve that opens and shuts the main channel;
   a dilution gas channel that is connected downstream from the main valve in the main channel and introduces a dilution gas into the main channel;
   a purge gas channel that branches from the dilution gas channel and has a downstream end connected downstream from the main valve in the main channel and upstream from a junction of the dilution gas channel; and
   a purge pump that is disposed in the purge gas channel, sucks a part of the dilution gas flowing through the dilution gas channel, and delivers the sucked part as a purge gas to the main channel.

2. The exhaust gas sampling device according to claim 1, wherein the vehicle uses the engine and an electric motor as power sources.

3. The exhaust gas sampling device according to claim 1, further comprising:
   a bypass channel that branches upstream from the main valve in the main channel and joins the main channel downstream from the main valve; and
   an auxiliary valve that opens and shuts the bypass channel.

4. The exhaust gas sampling device according to claim 3, wherein the auxiliary valve is capable of opening at a higher speed than the main valve.

5. The exhaust gas sampling device according to claim 3, wherein the engine operation detection unit is configured to output an opening command signal to the main valve and the auxiliary valve when detecting the start of the engine.

6. The exhaust gas sampling device according to claim 1, further comprising an engine operation detection unit that detects start and stop of the engine.

7. The exhaust gas sampling device according to claim 6, wherein the engine operation detection unit outputs a shutting command signal to the main valve when detecting the stop of the engine, and then starts the purge pump.

8. The exhaust gas sampling device according to claim 6, wherein the engine operation detection unit detects the start and stop of the engine based on a pulse interval that is a time interval between pulse signals generated in accordance with the operation of the engine and on a start threshold and a stop threshold used for detecting the start and the stop, respectively, of the engine, and wherein the start threshold is set to a larger value than the stop threshold.

9. The exhaust gas sampling device according to claim 8, wherein the engine operation detection unit is configured not to detect the start or stop of the engine again until a predetermined time elapses from the detection of the start or stop of the engine.

10. An exhaust gas analysis system comprising:

the exhaust gas sampling device according to claim 1;

a load device that applies a load to the vehicle or a part of the vehicle; and an exhaust gas analysis device that analyzes the exhaust gas collected in a sampling bag.

11. An exhaust gas sampling method for collecting an exhaust gas emitted from a vehicle including an engine or a part of the vehicle into a sampling bag, the method using an exhaust gas sampling device including a main channel through which the exhaust gas flows, a main valve that opens and shuts the main channel, a dilution gas channel that is connected downstream from the main valve in the main channel and introduces a dilution gas into the main channel, a purge gas channel that branches from the dilution gas channel and has a downstream end connected downstream from the main valve in the main channel and upstream from a junction of the dilution gas channel, and a purge pump disposed in the purge gas channel, the method comprising:

starting the purge pump after stop of the engine and delivering a part of the dilution gas flowing through the dilution gas channel as a purge gas to the main channel.

12. The exhaust gas sampling method according to claim 11, wherein the purge pump is automatically stopped after a predetermined time elapses from the start of the purge pump.

13. The exhaust gas sampling method according to claim 11, wherein the collection of the exhaust gas into the sampling bag is automatically stopped when a predetermined time elapses from the stop of the engine.

14. The exhaust gas sampling method according to claim 13, wherein the collection of the exhaust gas into the sampling bag is automatically restarted when the engine is restarted.

15. A non-transitory computer-readable medium having instructions thereon for a program for an exhaust gas sampling device, the program collecting an exhaust gas emitted from a vehicle including an engine or a part of the vehicle into a sampling bag, the exhaust gas sampling device including a main channel through which the exhaust gas flows, a main valve that opens and shuts the main channel, a dilution gas channel that is connected downstream from the main valve in the main channel and introduces a dilution gas into the main channel, a purge gas channel that branches from the dilution gas channel and has a downstream end connected downstream from the main valve in the main channel and upstream from a junction of the dilution gas channel, and a purge pump disposed in the purge gas channel, the program, when executed by a computer, causing the computer to function as a purge operation control unit that starts the purge pump after stop of the engine and delivers a part of the dilution gas flowing through the dilution gas channel as a purge gas to the main channel.

* * * * *